Aug. 13, 1946.  E. NIELSEN ET AL  2,405,707
MOTOR DRIVEN FOOD MIXER
Filed Sept. 12, 1944  3 Sheets-Sheet 2

Inventors~
Emanuel Nielsen
Arthur W. Seyfried
By Bertha L. M<sup>ac</sup>Gregor
Attorney.

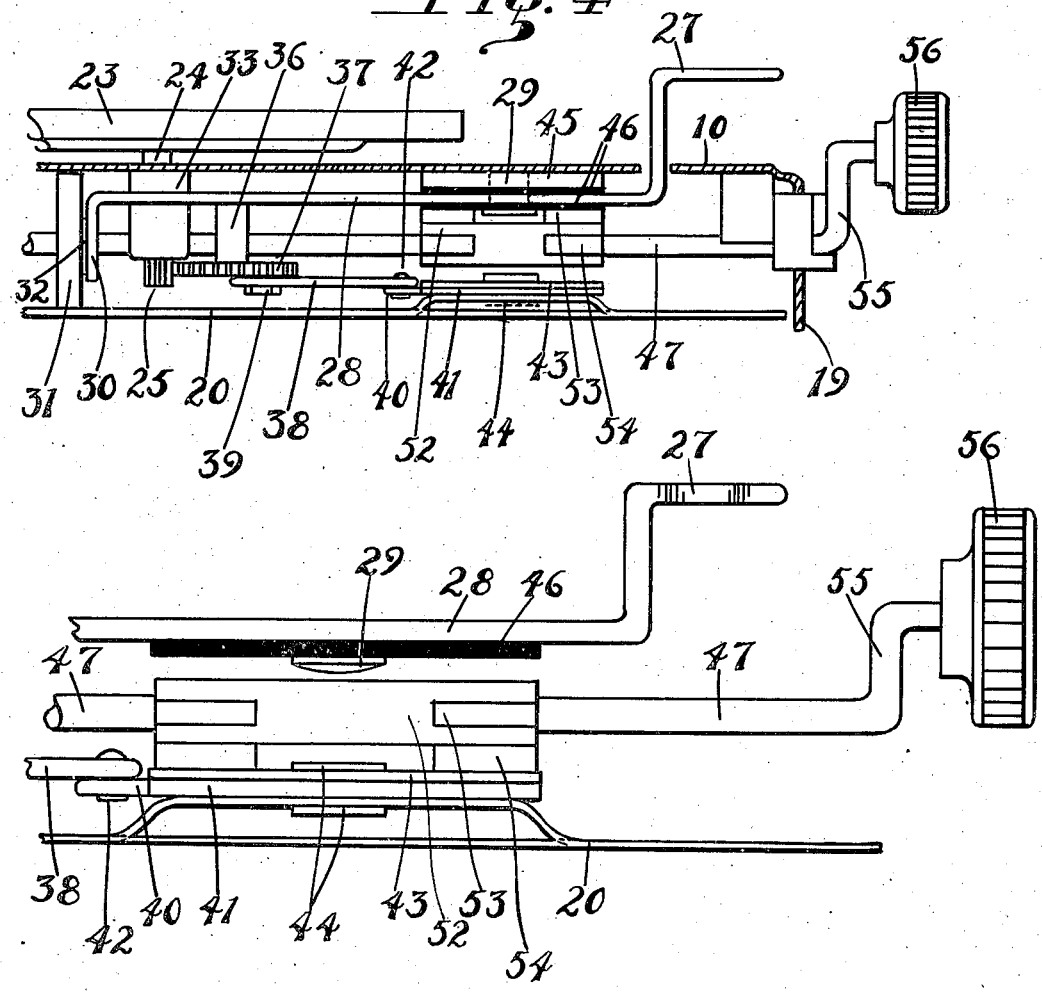

Patented Aug. 13, 1946

2,405,707

UNITED STATES PATENT OFFICE 2,405,707

MOTOR-DRIVEN FOOD MIXER

Emanuel Nielsen and Arthur W. Seyfried, Racine, Wis., assignors to Scovill Manufacturing Company, Waterbury, Conn., a corporation of Connecticut Application September 12, 1944, Serial No. 553,706

5 Claims. (Cl. 259—72)

This invention relates to motor driven food mixers and more particularly to a food mixer provided with means for automatically rotating the bowl support about its own axis and automatically shifting the axial position of said bowl-carrying support and bowl relatively to the agitators during the mixing operation.

It is old in the art to provide a motor driven food mixer with a support including revoluble means for carrying a mixing bowl, and having means associated with the agitator for automatically causing the bowl to revolve whether the bowl is empty or contains ingredients to be mixed, as shown in U. S. Patent No. 2,008,184, July 16, 1935. It is also old to provide manually operated means for gradually shifting the bowl and its support relatively to the agitators, as shown in U. S. Patent No. 2,028,408, January 21, 1936.

The provision of means for gradually moving the bowl laterally back and forth, relatively to the agitators, causes the material lying in different annular paths in the bowl to receive the full benefit of the mixing devices, whereas if the mixing bowl is revolved about a fixed axis the agitators cannot come into operative contact with all the material in the bowl. The advantages resulting from gradual shifting of the mixing bowl and its revoluble support without interruption of the mixing operation have been attained, heretofore, by the aforementioned manually operable means which, however, require the constant presence of and manipulation by the operator during the mixing operation.

The main object of our invention is to produce a mixer embodying automatically operable means for oscillating or reciprocating the revoluble support and bowl carried thereon, whereby the said bowl and support are gradually shifted back and forth relatively to the agitators, the gradual shifting of the axial position being accomplished without interruption of the mixing operation.

Another object is to provide automatically operable means for the purpose stated which gradually shift the bodily position of the bowl and its support relatively to the agitators, while the bowl is revolving about its own axis, regardless of the nature of the materials being mixed, that is, means which will function to oscillate the bowl and support even when the bowl contains a stiff dough or the like. In our improved mixer, the automatic oscillating or reciprocating means described embodies positive driving mechanism capable of gradually shifting the bowl support back and forth notwithstanding the resistance resulting from certain types of mixtures in the bowl.

In the drawings:

Fig. 4 is a vertical sectional view, enlarged, taken in the plane of the line 4—4 of Fig. 2, of part of the mixer base, but with the parts set for manual control of the bowl-carrying plate.

Fig. 5 is a view similar to Fig. 4, but enlarged relatively thereto, of a portion of the mechanism of Fig. 4, with the parts set for automatic control of the bowl-carrying plate.

Figure 1:
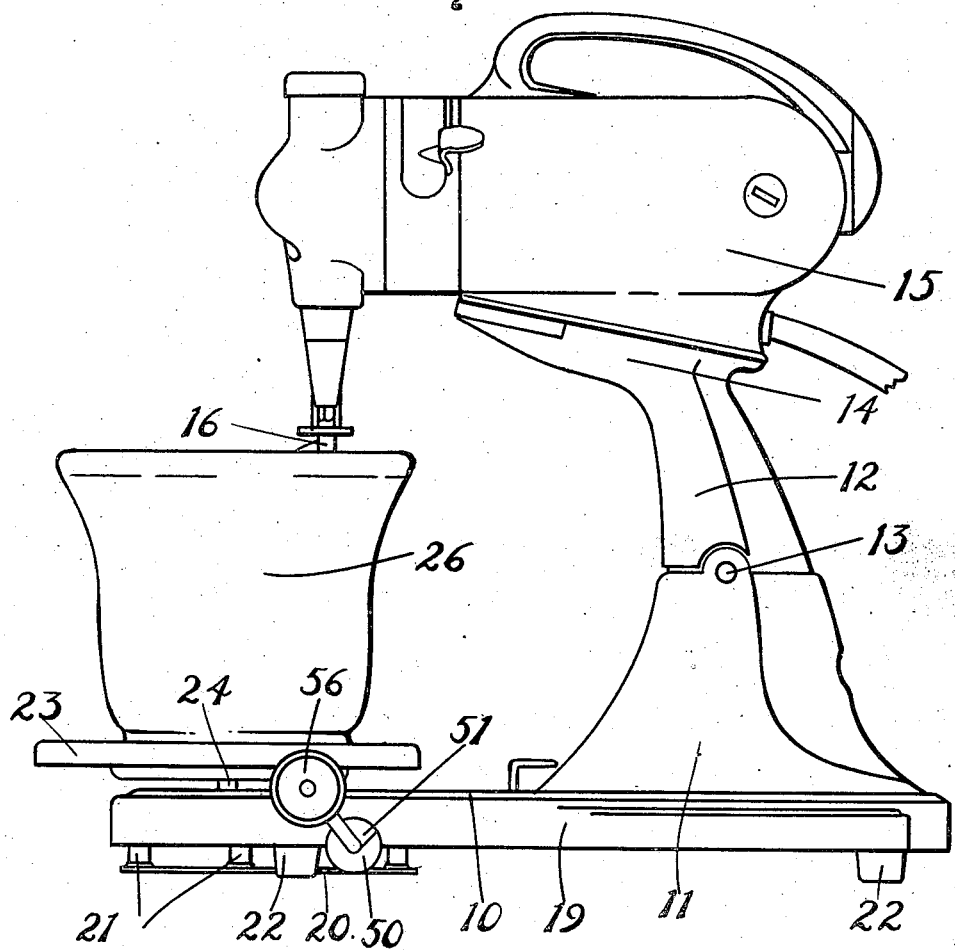
Fig. 1 is side elevation of a motor driven food mixer embodying our invention.

In that embodiment of the invention shown in the drawings, the platform portion of the mixer base is indicated at 10, the upright standard integral with the base at 11 and the upper portion 12 of the standard pivotally connected to the lower portion 11 by the rivet 13. The wedge shaped top 14 is designed to carry the motor unit 15 and agitator 16.

Figure 2:
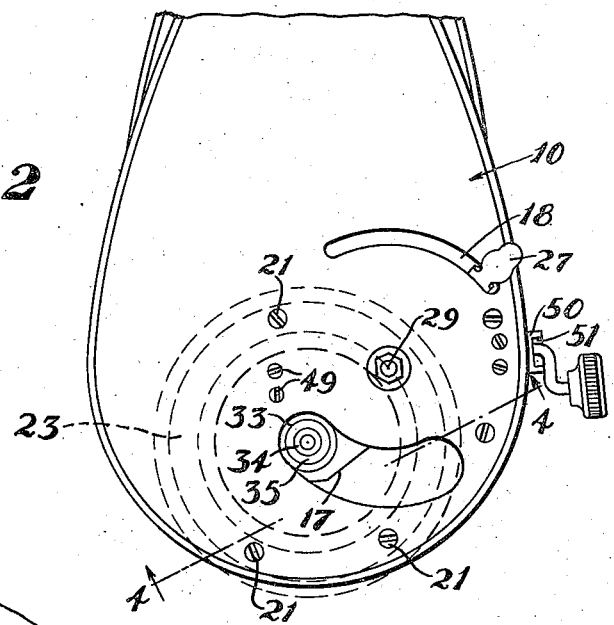
Fig. 2 is a top plan view of a portion of the mixer base, showing the bowl-carrying plate in dotted lines.
Figure 3:
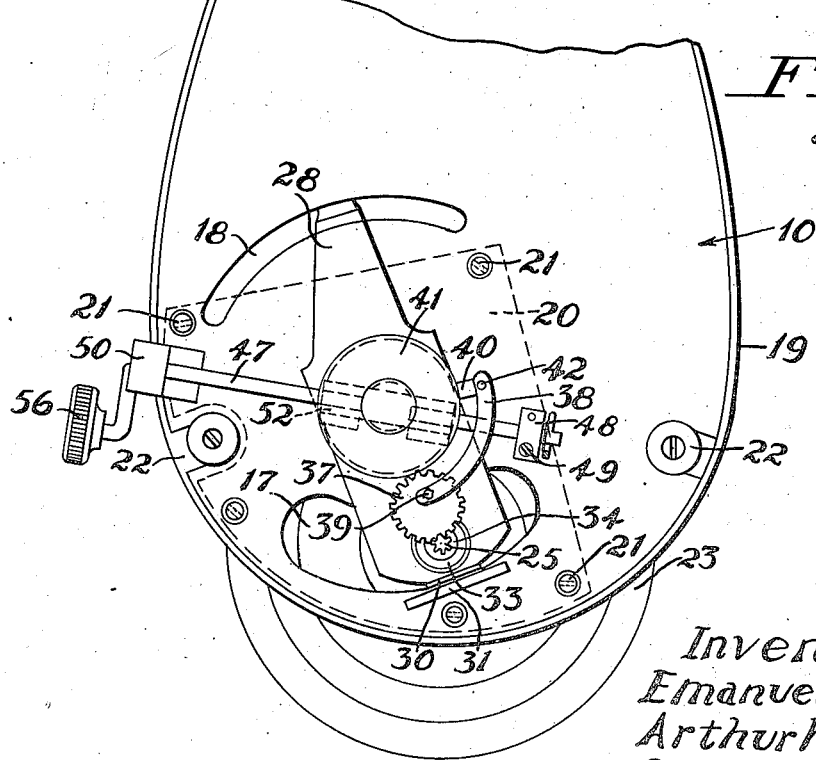
Fig. 3 is a bottom plan view on a larger scale than Fig. 2 of a portion of the mixer base and bowl-carrying plate, with the base plate removed to disclose the mechanism located between said base plate and the mixer base; the outline of the base plate being indicated in dotted lines.

The platform 10 is provided with a wide arcuate slot 17 and a narrow slot 18 as shown in Fig. 2. It is also provided with a downturned edge 19, and bottom plate 20 for carrying the mechanism for controlling the bowl-carrying plate, secured to the platform 10 by screws 21. Four feet for the platform are indicated at 22. The bowl-carrying plate 23 has a concentric hub 24 which has a pinion 25 on its lower portion. The plate 23 carries the bowl 26, which may vary in size.

The mechanism for rotatably supporting the plate 23 and for controlling its position relatively to the agitator 16 comprises a handle 27 integral with a horizontally disposed flat surfaced lever 28, rotatably mounted under the platform 10 by means of a screw 29 forming a fixed vertical axis for the lever 28 in said platform 10. The lever 28 has a downturned end 30 on which is mounted a guide wheel 31 on a journal 32. The wheel 31 rolls on the plate 20. Inwardly of the end of the lever 28 and extending through said lever is a socket 33 in which is mounted a sleeve 34 and a roller bearing member 35, the sleeve 34 being rotatable in said member 35. The sleeve 34 is adapted to receive the hub 24 of the bowl-carrying plate, with the pinion 25 projecting below the lower end of the sleeve 34. A stub shaft 36 depends fixedly from the lever 28 and a gear 37 is rotatably mounted on said shaft or fixed on a shaft rotatable in said stub shaft 36. The gear 37 meshes with the pinion 25. A curved connecting arm 38 has one end pivotally mounted eccentrically on the gear 37 by the screw pin 39 and the other end is pivotally connected to the arm 40 projecting from the disk 41 by a rivet 42. The disk 41 and overlying plate or washer 43 are concentrically mounted on a rivet 44 in the plate 20, the disk 41 being capable of rotative movement on said axis 44 during part of the operation of the mechanism as will be hereinafter explained.

The lever 28 is mounted between brake plates or washers 46, the upper one of the two being mounted on a plate 45. The screw pin 29 extends through these parts and mounts them on the base 10.

Extending substantially transversely of the base 10 is a horizontal rock shaft 47 mounted for limited rocking movement in a bearing block 50 located near the edge 19 of the base 10 and in a bearing block 48 secured by screws 49 to said base. The block 50 is cut away to form a V-notch 51 to receive and limit the movement of the rock shaft 47. Said shaft extends axially through and has fixedly mounted thereon a clutch member 52 provided with clutch faces 53 and 54. The outer end of the rock shaft 47 is bent at right angles to form an arm 55 on which is fixed a handle 56.

The operation of the device is as follows: For manual operation, the handle 56 is moved toward the standard 11, 12, as viewed in Fig. 1, and the parts are thus put in the position shown in Fig. 4, where the clutch faces 53 are in contact with a washer 46, causing the lever 28 to be frictionally retarded between the two washers 46 but not prevented from being moved about the axis of the mounting 29. When the handle 27 of the lever 28 is manually actuated back and forth in the slot 18, the socket 33 and the bowl-carrying plate 23 mounted therein are oscillated or reciprocated in an arcuate path in the slot 17. Since the plate 23 is being automatically rotated about its own axis 24 by reason of the bearing of the agitator on the bowl 26, as explained in the aforementioned U. S. Patent No. 2,008,184, the pinion 25 on the hub 24 will be rotated and thereby drive the gear 37, which in turn actuates the arm 38 and disk 41. However, during manual operation of the lever 28, these operations of the parts 37, 38 and 41 are merely idle.

When it is desired to oscillate or reciprocate the bowl-carrying plate relatively to its own axis and relatively to the agitator without having to manually operate the shift lever 28 for that purpose, the handle 56 of the rock shaft 47 is moved to the position shown in Figs. 1, 2, 3, and 5, whereby the clutch faces 53 are moved out of engagement with the friction washer 46, releasing the lever 28, and the clutch faces 54 engage the washer 43 and hold the disk 41 firmly against the bottom plate 20 and prevent rotation of the disk 41. In this position of the clutch 52, the automatic rotation of the bowl-carrying plate 23 transmits rotative movement to the hub 24 and pinion 25 to the gear 37. The gear 37 being eccentrically connected to the connecting arm 38, and the pivotal connection 42 between the arm 38 and disk 41 now being axially fixed by reason of the clutch 52 bearing on the plate 43 and disk 41, the arm 38 reciprocates the gear 37 while it is rotating about the center of the shaft 36, and thus bodily moves the gear 37, shaft 36 and lever 28. This action produces the same oscillating or reciprocating movement of the bowl and its support 23 and of the lever 28 and handle 27 as if the said handle 27 were manually operated to move the lever 28, but the desired result is accomplished automatically, without requiring the attendance of or manipulation of the lever 28 by the operator.

Changes may be made in details of construction without departing from the scope of our invention.

We claim:

1. A food mixer comprising a power unit, a laterally fixed rotatable agitator mounted in the power unit, a base, a mixing bowl, a shifter element mounted for lateral reciprocatory movement in the base, a bowl support rotatable in said shifter element, a pinion fixed on the bowl support to rotate therewith, a gear rotatably mounted on the shifter element in mesh with the pinion, an arm pivotally connected at one end to the gear eccentrically of the gear, a rotatable member mounted on a fixed support, the other end of the arm being pivotally connected to said rotatable member, and clutch means for holding said rotatable member stationary, rotation of said pinion caused by the rotary action of the agitator on the bowl imparting oscillatory movement to said shifter element laterally of the agitator.

2. A food mixer comprising an agitator, means for driving the same, a base, a support for holding the agitator and driving means in raised position relatively to the base, a bowl support, a shifter element reciprocably mounted in the base, means for rotatably mounting the bowl support on said shifter element, and mechanism operated by the rotation of the bowl support and operatively connected with said shifter element to automatically reciprocate said shifter element and bowl support laterally of the agitator during the operation of the agitator, said automatic means comprising a gear rotatably mounted on said shifter element, a connecting arm, a rotatably mounted disk, said arm being pivotally connected to said gear and said disk, a clutch arranged to bear on the disk and hold it stationary, a pinion on the bowl support, said gear meshing with said pinion, whereby rotation of the bowl support transmits rotative movement to said gear and reciprocating movement to said connecting arm, gear and shifter element.

3. A food mixer comprising a laterally stationary power unit, an agitator rotatably mounted in said power unit, a base, a mixing bowl, a bowl support rotatably mounted in the base and movable off-center with respect to the axis of the agitator, and mechanism mounted in the base and operatively connected to the bowl support imparting oscillatory movement to said bowl support, said oscillation imparting mechanism being driven by the rotation of the bowl support when said bowl and support are rotated by drag of the agitator on material in the bowl.

4. A food mixer comprising a laterally stationary power unit, an agitator rotatably mounted in said power unit, a base, a mixing bowl, a bowl support rotatably mounted in the base and movable off-center with respect to the axis of the agitator, manually operable means mounted in the base for shifting the bowl support laterally of the agitator, and mechanism in the base operatively connected with said manually operable shifting means and with said bowl support imparting oscillatory movement to said bowl support, said oscillation imparting mechanism being driven by the rotation of the bowl support when said bowl and support are rotated by the drag of the agitator on material in the bowl.

5. A food mixer comprising a laterally stationary power unit, an agitator rotatably mounted in said power unit, a base, a mixing bowl, a bowl support rotatably mounted in the base and movable off-center with respect to the axis of the agitator, manually operable means mounted in the base for shifting the bowl support laterally of the agitator, mechanism in the base operatively connected with said manually operable shifting means and with said bowl support for automatically imparting oscillatory movement to said bowl support, said oscillation imparting mechanism being driven by the rotation of the bowl support when said bowl and support are rotated by the drag of the agitator on material in the bowl, and manually controlled means for rendering said automatic oscillation imparting mechanism inoperative.

EMANUEL NIELSEN.
ARTHUR W. SEYFRIED.